July 31, 1962  D. D. GRIMES  3,047,253
WING VIBRATION DAMPER
Filed Nov. 7, 1952

INVENTOR
DAVID D. GRIMES
BY
ATTORNEYS

United States Patent Office 3,047,253
Patented July 31, 1962

3,047,253
WING VIBRATION DAMPER
David D. Grimes, Silver Spring, Md., assignor to the United States of America as represented by the Secretary of the Navy
Filed Nov. 7, 1952, Ser. No. 319,221
7 Claims. (Cl. 244—35)

This invention relates generally to aerial missiles and more particularly to an improved vibration damper for missile wings.

The wings of an aerial vehicle flying at a high speed are subjected to the phenomenon of regenerative vibrations. When the speed of the vehicle increases into the supersonic range the amplitude and frequency of the vibrations produced increase to the extent that wing control and structural strength are extremely difficult to maintain.

The principal object of this invention, therefore, is to provide a vibration damper which will continuously damp regenerative vibrations produced in the wings of supersonic guided missiles.

Further objects and advantageous features of the present invention will become apparent from the following detailed description when taken in conjunction with the accompanying drawing, in which.

Figure 1:
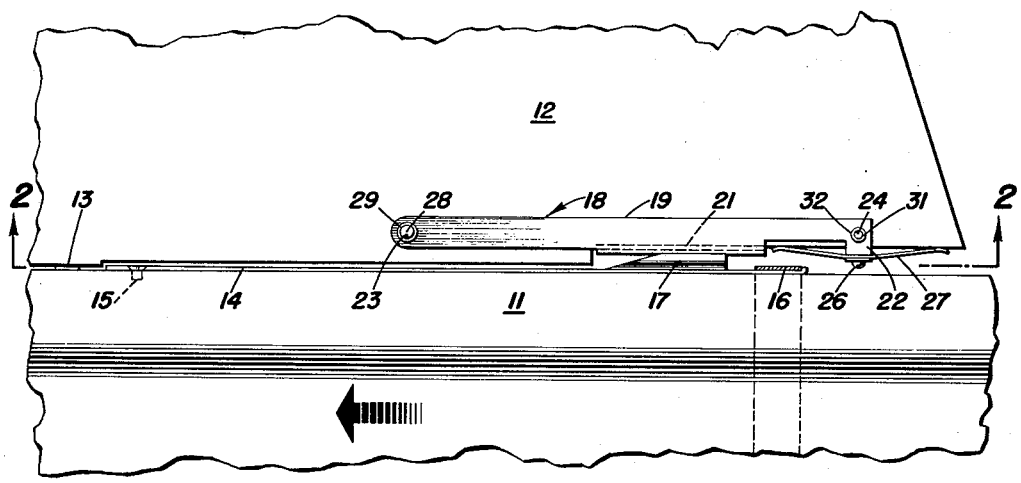
FIG. 1 is a fragmentary plan view of a guided missile equipped with the damping device embodying the present invention.
Figure 2:
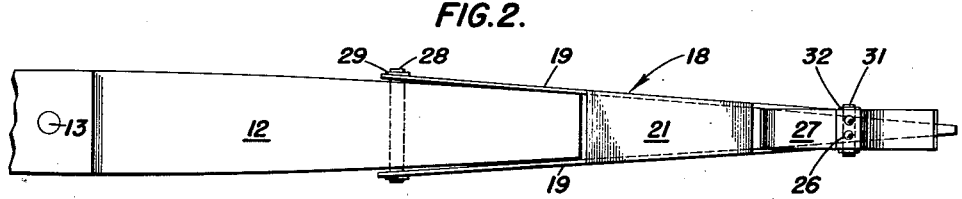
FIG. 2 is an elevation of a portion of the damping device as indicated by the lines 2—2 of FIG. 1.

Referring now to the drawing and particularly to FIG. 1, there is shown a body portion 11 and a wing portion 12 of a guided missile. The wing portion 12 is attached to the body portion 11 by a stub shaft 13 which controls the attitude of said wing portion with respect to the body portion 11. A curved saddle plate 14, conforming to the surface of the body portion 11, is secured on said body portion by screws 15 at one end and a strap 16 extending completely around the periphery of the missile at the other end. On the saddle plate 14 is fixed a block 17 of friction material which, similar to said saddle plate, is curved to fit the curvature of the body portion 11.

Figure 3:
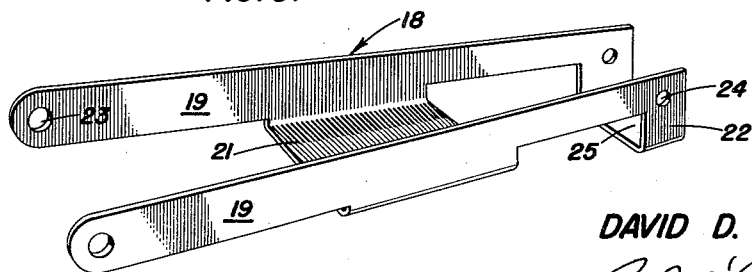
FIG. 3 is an enlarged perspective of an element of the damping device shown in FIG. 1.

Pivotally mounted on the wing portion 12 adjacent to the body portion 11 and at a distance from the shaft 13 is a bracket 18 having two flat legs 19 which converge but do not intersect, a flat transverse intermediate portion 21 connecting said legs, and a U-shaped end portion 22 connecting the convergent ends of said legs. The bracket 18, as best shown in FIG. 3, has two alined holes 23 in the divergent ends and two alined holes 24 in the convergent ends of the legs 19. The U-shaped end portion 22 is perpendicular to the legs 19 and has formed in its bight a pair of holes 25 for receiving rivets 26, the purpose of which will be explained now.

A leaf spring 27 is secured in longitudinal relationship with the bracket 18 to the U-shaped end portion 22 by the rivets 26, and bears upon the wing portion 12. The bracket 18 is pivotally mounted on the wing portion 12 by a pin 28 which passes through said wing portion and the holes 23 in the divergent end of said bracket. The pin 28 and the bracket 18 are retained in position on the wing portion 12 by retaining rings 29 which are snapped on the ends of said pin. A limit pin 31, passing through the wing portion 12 and retained in position by retaining rings 32, restricts the pivotal movement of the bracket 18 which is biased, by virtue of the spring 27, to move outwardly from said wing portion into engagement with the block 17.

In operation, the spring 27 urges the bracket 18 outwardly so that the flat intermediate portion 21 engages the block 17 of friction material. The normal force set up by the spring 27 between the block 17 and the intermediate portion 21 produces large frictional forces which restrain the vibrational movements of the wing portion 12 with respect to the body portion 11. Although the frictional restraints produced by the engagement of the bracket 18 and the block 17 are adequate to damp vibrational movements, they are not sufficiently great to prevent the intentional control of the wing portion 12. Thus, it can be seen that the regenerative vibrations normally produced in the wing during the flight of the missile are effectively damped.

Obviously many other modifications and variations of the present invention are possible in the light of the teachings of the foregoing detailed description. Therefore, it is to be understood that the foregoing description is intended to be illustrative, and not restrictive, of the present invention, as defined by the appended claims.

What is claimed is:

1. In an aerial vehicle having a body and a wing, a device for damping regenerative vibrations produced in the wing during flight of the vehicle, comprising a bracket having a pair of convergent legs, a flat intermediate portion connecting said legs and a U-shaped end portion connecting the convergent ends of said legs, the divergent ends of said legs being pivotally mounted on the external surfaces of said wing adjacent to said body of said vehicle, the legs of said bracket being disposed on opposite sides of said wing, a block of friction material mounted on said body adjacent to said flat intermediate portion, and spring means mounted on said U-shaped end portion and bearing upon said wing to urge continually said bracket away from said wing towards said body, whereby said flat intermediate portion engages said block to provide frictional restraint to vibrational movements.

2. In an aerial vehicle having a body and a wing, a device for damping regenerative vibrations produced in the wing during flight of the vehicle, comprising a bracket having a pair of convergent legs, a flat portion connecting the intermediate portions of said legs and a U-shaped end portion perpendicular to and connecting said legs, the divergent ends of said legs being pivotally mounted on the vehicle wing so that said legs are disposed on opposite surfaces of said wing, means for limiting the pivotal movement of said bracket, a block of friction material mounted upon the vehicle body adjacent to the flat portion of said bracket, and spring means mounted on said U-shaped end portion and bearing upon said wing to urge the flat portion of said bracket into engagement with said block of friction material.

3. In an aerial vehicle having a body and a wing, a device for damping regenerative vibrations produced in the wing during flight of the vehicle, comprising a bracket having a pair of convergent legs, a flat portion connecting the intermediate portions of said legs and a U-shaped end portion perpendicular to and connecting the convergent ends of said legs, the divergent ends of said legs being pivotally mounted on the vehicle wing so that said legs are disposed on opposite surfaces of said wing and the convergent ends having a pair of alined holes, a pin of smaller cross-sectional size than said holes, said pin being securely fixed to said wing and passing through both of said holes to limit the pivotal movement of said bracket, a block of friction material mounted on the vehicle body adjacent to said flat portion of said bracket, and spring means mounted on the bight of said U-shaped end portion, said spring means bearing upon said wing to urge the bracket towards said body, whereby said flat end portion is caused to engage said block to restrain the vibrational movement of the vehicle wing.

4. In combination with an aerial vehicle having a body and a wing, a bracket straddling the wing in a position confronting the body, said bracket including a pair of convergent legs, a flat plate connecting the intermediate portions of said legs and a U-shaped end portion perpendicular to and connecting said legs, and friction means on the body and engageable by the bracket, said bracket and friction means damping regenerative vibrations produced in the wing during flight of the vehicle.

5. The combination recited in claim 4, wherein the means is constituted by a saddle plate on the surface of the body confronting the wing, and a block of friction material on the saddle plate.

6. The combination recited in claim 5, including means on the bracket urging said bracket toward the friction block.

7. In combination with an aerial vehicle having a body and a wing, a movable bracket pivotally mounted on the wing in a position confronting the body, said bracket including a pair of convergent legs, a flat plate interconnecting said legs medially of their length and a U-shaped end portion connecting the convergent ends of said legs, means on said bracket for urging said bracket towards said body and means on the body and bearing against said flat plate for resisting motion of said bracket relative to said body.

References Cited in the file of this patent
UNITED STATES PATENTS

| | | |
|---|---|---|
| 1,997,285 | Weymouth | Apr. 9, 1935 |
| 2,342,578 | Giannini | Feb. 22, 1944 |
| 2,471,857 | Bleakney | May 9, 1946 |
| 2,603,437 | Satre | July 15, 1952 |